2,759,924

PREPARATION OF CELLULOSE PHOSPHATES

George P. Touey, Kingsport, Tenn., assignor to Eastman Kodak Company, Rochester, N. Y., a corporation of New Jersey No Drawing. Application January 2, 1952,
Serial No. 264,677

3 Claims. (Cl. 260—219)

The present invention relates to water-soluble cellulose phosphates and a method of manufacturing the same by reacting upon cellulose with a mixture of phosphoric acid and $P_2O_5$ in the presence of a liquid alcohol as the diluent therein.

A number of methods for preparing cellulose phosphates have been previously disclosed, but the products of substantially all of these methods have either been insoluble in all solvents or soluble in certain organic solvents but insoluble in water. A review of methods for phosphating cellulose is found, for instance, in Industrial and Engineering Chemistry, volume 41, page 2828 (December 1949). There have, however, been disclosures of the preparation of water-soluble cellulose phosphates in U. S. Patent No. 1,848,524 and British Patent No. 279,796. These patents state that a water-dispersible cellulose phosphate can be prepared by causing alkali cellulose to react with $POCl_3$ in the presence of benzene. The products, however, obtained by this process are highly degraded and, in addition, are contaminated with sodium chloride. Also, recently published investigations indicate that a water-soluble cellulose phosphate is not obtained by this reaction (see Industrial and Engineering Chemistry, volume 41, page 2830; December 1949).

My invention relates to a method of preparing stable water-soluble cellulose phosphates which are substantially undegraded, as indicated by good viscosity in contrast to cellulose phosphates which have previously been prepared, particularly where water solubility has been desired. The products of my invention have high molecular weights, and when dissolved in water form highly viscous solutions at low concentrations. These cellulose phosphates are prepared by treating cellulose with an esterifying solution consisting of a phosphoric acid and $P_2O_5$ in a diluent essentially consisting of a liquid alcohol which is miscible with the acid. The presence of this alcohol prevents the cellulose and the product obtained therefrom from dissolving in the reaction mixture, and therefore the product is obtained from the finished esterification mass merely by separating the liquid therefrom. As no chlorine compounds are used, the degrading action of hydrochloric acid on cellulose and the necessity of strong cooling during the esterification reaction is avoided. Also, in accordance with my process, it is not necessary to use alkali cellulose as the starting material, as cellulose itself may be employed for this purpose.

The acid which is employed for esterifying the cellulose may be any of the known phosphoric acids, such as ortho, meta or pyrophosphoric acid, or any mixture of these acids. There is mixed with this acid $P_2O_5$ in a sufficient amount to assure a 10% excess of $P_2O_5$ therein. Although phosphoric acid ordinarily comes in the form of the 85% acid, sufficient $P_2O_5$ is mixed therewith to not only eliminate the water content therefrom, but also to assure the presence of an excess of $P_2O_5$. Ordinarily, not more than 50% of $P_2O_5$, with reference to the phosphoric acid, is employed.

The diluent for the phosphoric acid may be any of the liquid alcohols. Although the preferred alcohols for use in my invention are the aliphatic alcohols of 4 to 10 carbon atoms, other liquid alcohols are also suitable therefor. However, when alcohols such as methyl, ethyl or propyl are used, it has been found desirable to use a higher ratio of phosphoric acid to alcohol and also a longer time of reaction than where using the preferred alcohols. Some of the preferred alcohols which are useful in my invention are butyl, amyl, hexyl, 2-ethyl hexyl, octyl and the like. If desired, however, cyclic alcohols such as cyclohexanol, or polyhydroxy alcohols such as ethylene glycol may be employed. Also, ether alcohols such as methyl cellosolve or ethyl cellosolve may be employed as the diluent in the process which I have described. In some cases it may be desirable to use a mixture of an alcohol and another diluent, such as triethyl phosphate, for this purpose. The latter may be used in a proportion up to equal parts with the alcohol, and the esterification reaction proceeds satisfactorily. The esterification mass should, however, be anhydrous, as the presence of water cannot be tolerated in carrying out the phosphating of cellulose in accordance with my invention.

In carrying out processes in accordance with my invention, it is preferred that when alcohols containing 1–3 carbon atoms are used, the weight ratio of phosphoric acid to alcohol should be at least 3:1, and may be up to as much as 6:1. With alcohols containing 4–7 carbon atoms, the weight ratio of phosphoric acid to alcohol should preferably be at least 2:1, whereas with alcohols containing at least 8 carbon atoms, a ratio to as low as 1:1 can be employed. However, these ratios may be varied to some extent upon variation of the temperature employed in the reaction. For instance, by increasing the temperature, the amount of alcohol employed can be increased. In all of these cases, ordinarily a proportion of 6:1 will be satisfactory as an upper limit for the ratio of phosphoric acid to alcohol.

Ordinarily the reaction, in accordance with my invention, will be conducted at room temperature (20–30° C.), as the use of elevated temperatures tends to reduce the degree of polymerization of the cellulose, and, on the other hand, low temperatures cause a considerable decrease in the rate at which the reaction proceeds. The time required varies, depending on the conditions employed in the reaction and the amount and type of diluent employed. For instance, with low dilution and the use of an alcohol of 8 to 10 carbon atoms, the reaction time may be but a few hours. On the other hand, with a low molecular-weight alcohol, as much as 3 to 5 days may be required to obtain a water-soluble cellulose phosphate.

The cellulose acid phosphates obtained by the method of my invention can be readily washed by means of any nonaqueous solvent which is miscible with the esterifying solution to be removed. For instance, the same alcohol which was employed in the esterification mass can be used to wash the product. However, it may be that a low boiling solvent, such as methanol, will be used so that recovery of the washed-out esterifying solution by distillation may be accomplished. The product thus obtained is a cellulose acid phosphate. If desired, the product can be neutralized by means of an alkaline alcoholic solution such as alcoholic sodium hydroxide or ammonium hydroxide. Instead, salts of the product may also be prepared by slurrying the cellulose acid phosphate in a methanol-water solution of an acetate, such as sodium acetate and the like. If, in preparing the salts, a polyvalent substituent is supplied, a water-insoluble product may be obtained. For instance, if the cellulose acid phosphate prepared in accordance with my invention is treated with an aqueous calcium acetate solution, water-insoluble calcium cellulose phosphate would result.

Cellulose in any dried state can be employed as the starting material, in accordance with my invention. For instance, wood pulp or cotton linters may be employed therefor. It is preferred, however, to employ the cellulose in finedly divided state, as it has been found that a larger ratio of cellulose to esterifying solution can be employed. For instance, with powdered cellulose, ratios as high as 1 part of cellulose to 5–10 parts of esterifying solution can be employed. However, proportions of 1 part of cellulose up to 30 parts or even more of esterifying solution may be employed in my invention.

The water-soluble cellulose phosphates obtained in accordance with my invention usually have a phosphorus content of 2–13% corresponding to 0.1 to 1 phosphate group per $C_6$ unit of cellulose. However, this range is not to be regarded as limiting, as any introduction of phosphate group into the cellulose, which renders the same water-soluble, is within the contemplation of my invention, being governed to some extent by the degree of polymerization of the cellulose. In the esterification, in accordance with my invention, the degree of polymerization of the cellulose is only lowered to a comparatively small extent, and therefore products of good viscosity are obtained, as shown when the cellulose acid phosphates of my invention are dissolved in water. The water-soluble neutral salts of the cellulose phosphates, in accordance with my invention, are stable to heat, both when dry and in solution. Also, these solutions maintain their original viscosity when stored at room temperature, although upon boiling, the viscosity thereof is lowered. The products of my invention, both as to the acid phosphates and the salt derivatives, are nonhygroscopic. These compounds are useful in a wide variety of commercial applications. For instance, in the textile industry they are valuable as sizing agents, finishing agents, dye-dispersing agents, detergent additives and the like. In the food, cosmetic and pharmaceutical industries, they are useful as thickening agents, for stabilizing emulsions or for suspending materials, for use in forming capsules, as binding agents in medicinal tablets and the like. These products also are useful for adhesive purposes, as coating materials for paper, cloth, film, or the like, or as creaming agents for natural or synthetic latices. The cellulose phosphates, as prepared in accordance with my invention, are useful in applications requiring a water-soluble compound possessing suspending, thickening, stabilizing and gel or film-forming properties.

One specialized application for these cellulose phosphates is as viscosity modifiers and water retainers in well drilling muds. Also, these compounds are characterized by resistance to inflammability, and hence may be useful in that connection.

*Example 1*

10 parts of powdered cellulose were mixed at 25° C. with a mixture of 232 parts of ortho phosphoric acid (85%), 128 parts $P_2O_5$ and 120 parts isopropanol. After mixing for 72 hours, the resulting cellulose acid phosphate which formed was separated from the mixture by means of a centrifuge and washed in isopropanol until free of the esterifying solution. The dry cellulose acid phosphate was soluble in water, having a viscosity of 600 cps. at 25° C. at 5% concentration. The sodium salt of the product was prepared by slurrying the product for 20 minutes in 250 parts of a solution of 15 parts of sodium acetate, 75 parts of water and 175 parts of methanol. The sodium acetate solution was filtered off and the product was washed in three 500-part portions of a 3:1 methanol-water solution. This product has a viscosity in water at 5% concentration of 500 cps. at 25° C. The product has a phosphorus content of 4.5%.

*Example 2*

10 parts of powdered cellulose were mixed at 25° C. with a mixture of 232 parts of 85% ortho phosphoric acid, 128 parts of $P_2O_5$ and 120 parts of normal butyl alcohol. After mixing for 32 hours, the cellulose acid phosphate formed was separated from the mixture by means of a centrifuge and washed in methanol until free of the liquid. The dry cellulose acid phosphate formed was water soluble. Its sodium salt had a viscosity of 2,000 cps. at 5% concentration, and a phosphorus content of 5.3%.

*Example 3*

10 parts of powdered cellulose were mixed at 25° C. with a mixture of 232 parts of ortho phosphoric acid (85%), 128 parts of $P_2O_5$ and 120 parts of 2-ethyl hexanol. After 18 hours, the cellulose acid phosphate which had formed was separated from the mixture by means of a centrifuge and washed in a 3:1 methanol-water solution until free of the esterifying solution. The dry cellulose acid phosphate was soluble in water and formed a gel at 5% concentration. A 2% solution thereof in water exhibited a viscosity of 550 cps. at 25° C. The sodium salt was prepared by slurrying a portion of the cellulose acid phosphate in 500 parts of ethyl alcohol containing 5 parts of dissolved NaOH. After washing with methanol-water until a pH of 7.5 was reached and drying, a product was obtained having a viscosity of 420 cps. at 25° C. in water at 2% concentration, and a phosphorus content of 6.3%.

The ammonium salt of this ester was prepared by slurrying another portion thereof in 500 parts of a 5% alcoholic ammonium hydroxide solution and proceeding as above. The dry product had a viscosity in 2% concentration in water of 480 cps. at 25° C. Films thereof were prepared by evaporating aqueous 4% solutions of these salts. The films obtained were colorless, strong and flexible, and did not ignite when exposed to a flame.

*Example 4*

10 parts of refined, powdered, wood pulp were mixed at 25° C. with a mixture of 232 parts of 85% ortho phosphoric acid, 128 parts of $P_2O_5$, 120 parts of 2-ethyl hexanol and 120 parts of triethyl phosphate. After mixing together for 24 hours, the cellulose acid phosphate formed was separated from the mixture by filtration and washed in a 3:1 methanol-water solution until free of the esterifying reagent. The product was water soluble. The monoethanolamine salt thereof was prepared by slurrying the product in a solution consisting of 200 parts of methanol, 50 parts of water and 10 parts of monoethanolamine. The mass was filtered and the salt obtained was washed free of excess monoethanolamine. The dry product was soluble in water and exhibited a viscosity of 6,000 cps. in water at 5% concentration. The product obtained had a phosphorus content of 6.1%.

I claim:

1. The method of producing high viscosity water-soluble cellulose acid phosphates which comprises reacting upon cellulose with an anhydrous esterification bath essentially consisting of a phosphoric acid, selected from the group consisting of the orthophosphoric, metaphosphoric and pyrophosphoric acids, $P_2O_5$ in an amount constituting 10–50% of the phosphoric acid and 0.1–5 parts of an alcohol diluent miscible with the phosphoric acid until there has been imparted to the cellulose 0.1–1 phosphate groups per $C_6$ unit of cellulose.

2. The method of producing high viscosity water-soluble cellulose acid phosphates which comprises reacting upon cellulose with an anhydrous esterification bath essentially consisting of orthophosphoric acid, $P_2O_5$, in an amount of 10–50% of the weight of the phosphoric acid and an alcohol diluent until there has been imparted to the cellulose 0.1–1 phosphoric acid groups per $C_6$ unit of cellulose.

3. The method of producing high viscosity water-soluble cellulose acid phosphates which comprises reacting upon cellulose with an anhydrous esterification bath consisting of orthophosphoric acid, 10–50% (based on the weight of the phosphoric acid) of $P_2O_5$ and as the diluent therein 2-ethylhexyl alcohol until there has been imparted to the cellulose 0.1–1 phosphate groups per $C_6$ unit of cellulose.

References Cited in the file of this patent

UNITED STATES PATENTS

| | | |
|---|---|---|
| 1,787,542 | Miles et al. | Jan. 6, 1931 |
| 1,962,827 | Malm | June 12, 1934 |
| 2,265,585 | Urbain | Dec. 9, 1941 |

OTHER REFERENCES

Reid et al.: Ind. and Eng. Chem., vol. 41, Dec. 1949, "Cellulose Phosphates," pages 2828–2831.

Reid et al., ibidum, pages 2831–2834.